(12) United States Patent
Hopkins et al.

(10) Patent No.: US 8,875,054 B2
(45) Date of Patent: Oct. 28, 2014

(54) HYBRID KNOB/SLIDER CONTROL

(75) Inventors: Michael Stephen Hopkins, Mountain View, CA (US); Robert David Aron, San Jose, CA (US)

(73) Assignee: Apple Inc., Cupertino, CA (US)

( * ) Notice: Subject to any disclaimer, the term of this patent is extended or adjusted under 35 U.S.C. 154(b) by 204 days.

(21) Appl. No.: 12/848,078

(22) Filed: Jul. 30, 2010

(65) Prior Publication Data

US 2012/0030626 A1 Feb. 2, 2012

(51) Int. Cl.
*G06F 3/048* (2013.01)

(52) U.S. Cl.
USPC .......................................... 715/833; 715/834

(58) Field of Classification Search
USPC ............................ 715/833, 834, 837; 345/650
See application file for complete search history.

(56) References Cited

U.S. PATENT DOCUMENTS

| | | | |
|---|---|---|---|
| 5,450,540 A * | 9/1995 | Spohrer et al. ................. | 715/763 |
| 5,483,261 A | 1/1996 | Yasutake | |
| 5,488,204 A | 1/1996 | Mead et al. | |
| 5,559,301 A * | 9/1996 | Bryan et al. ..................... | 84/653 |
| 5,627,951 A * | 5/1997 | Chaplin et al. ................. | 345/601 |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,080,324 B1 * | 7/2006 | Nelson et al. ................. | 715/771 |
| 7,184,064 B2 | 2/2007 | Zimmerman et al. | |
| 7,421,656 B2 | 9/2008 | Fong et al. | |
| 7,446,751 B2 * | 11/2008 | Yamamoto .................... | 345/156 |
| 7,562,302 B1 | 7/2009 | Barrus et al. | |
| 7,663,607 B2 | 2/2010 | Hotelling et al. | |

(Continued)

FOREIGN PATENT DOCUMENTS

| | | |
|---|---|---|
| CN | 101425307 A | 5/2009 |
| JP | 2000-163031 A | 6/2000 |
| JP | 2002-342033 A | 11/2002 |
| WO | WO-2010/088607 A1 | 8/2010 |

OTHER PUBLICATIONS

Appino, P, "Hybrid Dial/Slider Icon", Nov. 1, 1990, IBM Technical Disclosure Bulletin, vol. 33, No. 6A, pp. 198-199.*

(Continued)

*Primary Examiner* — William Bashore
*Assistant Examiner* — Jeanette J Parker
(74) *Attorney, Agent, or Firm* — Morrison & Foerster LLP

(57) ABSTRACT

A control object including a knob element is displayed in a GUI. A first user input can be detected that indicates selection of the knob element. In response to the first user input, the knob element can be visually augmented. The visual augmentation can include displaying text labels of range limit values and a slider element with the knob element. The slider element can include a fill bar to indicate the current value of the knob element. A second input can be a linear motion on or near the slider control. In response to the second user input, both the fill bar of the slider element and a fill portion of the knob element can be visually augmented to indicate the change in the value. A cursor image of a pointing device providing the second input can be hidden at least during the receiving of the second input.

20 Claims, 5 Drawing Sheets

(56) References Cited

U.S. PATENT DOCUMENTS

| | | | |
|---|---|---|---|
| 7,742,606 B2* | 6/2010 | Kreifeldt et al. ............... 381/58 |
| 8,085,269 B1* | 12/2011 | Classen ............... 345/440 |
| 8,098,235 B2* | 1/2012 | Heubel et al. ............... 345/173 |
| 8,188,972 B1* | 5/2012 | Krenz et al. ............... 345/157 |
| 8,479,122 B2 | 7/2013 | Hotelling et al. |
| 2002/0063740 A1* | 5/2002 | Forlenza et al. ............... 345/856 |
| 2003/0112262 A1 | 6/2003 | Adatia et al. |
| 2005/0262451 A1* | 11/2005 | Remignanti et al. ............... 715/833 |
| 2006/0026521 A1 | 2/2006 | Hotelling et al. |
| 2006/0197753 A1 | 9/2006 | Hotelling |
| 2007/0106939 A1* | 5/2007 | Qassoudi ............... 715/704 |
| 2007/0159497 A1* | 7/2007 | Gur et al. ............... 345/650 |
| 2008/0072166 A1 | 3/2008 | Reddy |
| 2008/0126937 A1* | 5/2008 | Pachet ............... 715/720 |
| 2011/0202430 A1 | 8/2011 | Narayanan et al. |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Final Office Action mailed Feb. 19, 2013, for U.S. Appl. No. 12/958,176, filed Dec. 1, 2010, 15 pages.

Non-Final Office Action mailed Sep. 19, 2012, for U.S. Appl. No. 12/958,176, filed Dec. 1, 2010, 13 pages.

Non-Final Office Action mailed Oct. 15, 2013, for U.S. Appl. No. 12/958,176, filed Dec. 1, 2010, 14 pages.

Final Office Action mailed Feb. 19, 2014, for U.S. Appl. No. 12/958,176, filed Dec. 1, 2010, 13 pages.

* cited by examiner

US 8,875,054 B2

HYBRID KNOB/SLIDER CONTROL

TECHNICAL FIELD

This disclosure relates generally to computer generated graphical user interfaces.

BACKGROUND

Modern computer operating systems often provide a desktop graphical user interface ("GUI") for displaying various graphical objects. Some examples of graphical objects include windows, taskbars, docks, menus and various icons for representing documents, folders and applications. A user can interact with the desktop using a mouse, trackball, track pad or other known pointing device. If the GUI is touch sensitive, then a stylus or one or more fingers can be used to interact with the desktop.

Some computer applications include knobs, sliders and other controls that can be manipulated by a user through a pointing device or by touch input. For example, graphical objects emulating knobs and sliders of an audio mixing board or other hardware device can be included in the GUI of an audio or video application. The user can use a mouse or finger to rotate the knob control or move the slider control as desired to control a parameter of the application.

Many GUIs use knob controls to dial inputs up or down. However, traditional GUI knob controls typically have several drawbacks. For example, the interaction model of the knob control can be unclear, such that the user may not know whether to move a mouse pointer vertically, horizontally or in a circle to change the value of the knob control. Additionally, the resolution of a knob control may be less than other types of GUI controls (e.g., a slider control).

SUMMARY

A hybrid knob/slider control is disclosed that can replace conventional knob controls. A control object including a knob element can be displayed in a GUI presented on a display of a device. A first user input can be detected that is indicative of a selection of the knob element. In response to the first user input, the knob element can be visually augmented. The visual augmentation can include displaying an outline and/or fill region (e.g. a color or pattern fill) around the knob element, displaying text labels for minimum and maximum range limit values and displaying a slider element with the knob element. The slider element can include a fill bar to indicate the current value of the knob control.

A second user input can be detected that is indicative of a change of the value of the knob element. The second input can be a linear motion on or near the slider element. In response to the second user input, both the fill bar of the slider element and a fill portion of the knob element can be visually augmented to indicate the change in the value.

The visual augmentation can provide a visual cue of the interaction model for the knob element. For example, the visual augmentation can include displaying a horizontal slider element with the knob element to visually indicate to the user that linear motion along the horizontal or longer dimension of the slider element with a pointing device will manipulate the knob element. The visual augmentation can also provide increased resolution for the knob element by removing the cursor image from the screen and providing an active input region for detecting the linear motion of the pointing device that is wider than the slider element. In some implementations, the slider element can be vertical or arched to indicate linear motion in the vertical direction or circular motion, respectively, to manipulate the knob element. In some implementations, the value of the knob element can also be changed through manual text entry.

In some implementations, a computer-implemented method includes: providing a control object for display on a graphical user interface presented on a display of a device, the control object including at least one knob element; detecting a first input indicating a user interaction with the control object; augmenting the control with a slider element, the slider element having a first dimension and a second dimension, where the second dimension is longer than the first dimension; detecting second input indicating motion in the graphical user interface, the direction of the motion along the second dimension of the slider element; changing a value of the control object according to the direction of the motion; and augmenting the knob element and the slider element to provide visual cues of the value of the control object.

In some implementations, a computer-implemented method includes: providing a control object for display on a graphical user interface presented on a display of a device, the control object including at least one knob element; receiving a first input indicating an intention of a user to select the control object; augmenting the control object to indicate its selection; receiving a second input indicating an intention of the user to change a value of the control object; and augmenting the control object to include a slider element, the slider configured to provide a visual cue to the user of the value and the interaction model of the knob element.

Other implementations can include systems, devices, and computer-readable storage mediums. The details of one or more implementations of a hybrid knob/slider control are set forth in the accompanying drawings and the description below. Other features, aspects, and advantages of the hybrid knob/slider control will become apparent from the description, the drawings, and the claims.

BRIEF DESCRIPTION OF THE DRAWINGS

Like reference symbols in the various drawings indicate like elements.

DETAILED DESCRIPTION

Example Hybrid Knob/Slider Control

Figure 1A:
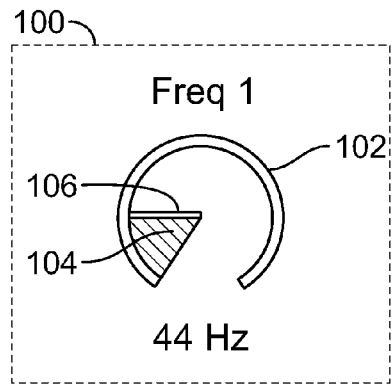
FIG. 1A illustrates the appearance of an exemplary hybrid knob/slider control in a default state.

FIG. 1A illustrates the appearance of an exemplary hybrid knob/slider control in a default state. In the default state, a control object 100 with a knob element 102 is displayed. A parameter name label can be displayed above the knob element 102 (e.g., "Freq 1"), and a current value (e.g., "44") and units label (e.g., "Hz") can be displayed below the knob element 102. The knob element 102 can include a fill portion 104 (e.g., a "pie slice") showing the current value of the knob element 102 as a percentage of a range, and a line 106 indicating the current value of the knob element 102. Minimum and maximum range limits for the value are not displayed but could be if desired.

Figure 1B:
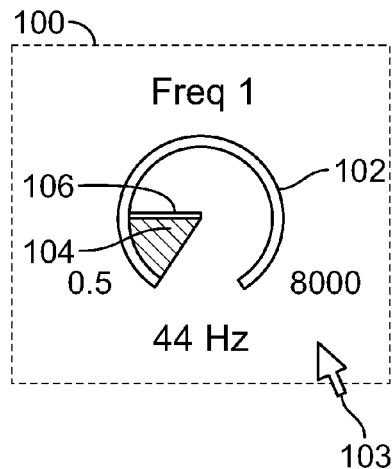
FIG. 1B illustrates the appearance of the hybrid knob/slider control in a first active state.

FIG. 1B illustrates the appearance of the hybrid knob/slider control of FIG. 1A in a first active state. In the first active state, a user has moved a mouse or other pointing device over the control object 100. The outline of the knob element 102 can be made brighter to indicate the selected state and text labels for minimum and maximum range limits (e.g., "0.5" and "8000") can be displayed. A mouse cursor image 103 is displayed.

Figure 1C:
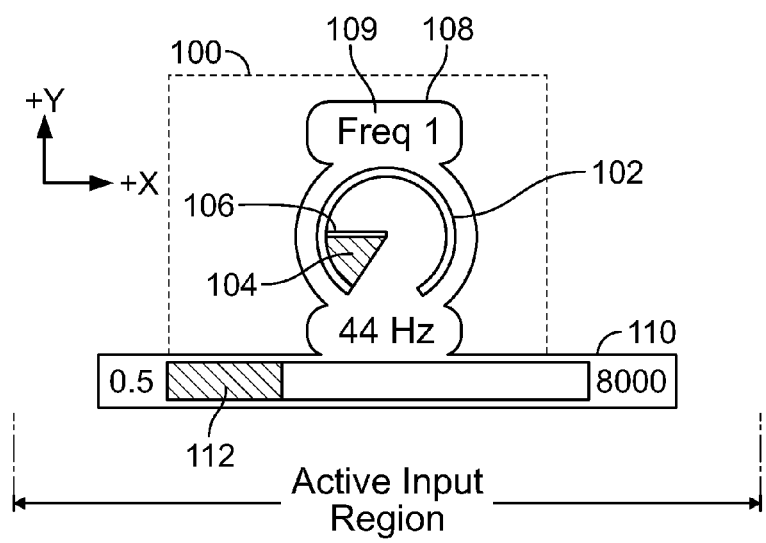
FIG. 1C illustrates the appearance of the hybrid knob/slider control in a second active state.

FIG. 1C illustrates the appearance of the hybrid knob/slider control of FIG. 1B in a second active state. In the second active state, a user has mouse-down or clicked on the control object 100. In response to the mouse-down or click, the control object is augmented with an outline 108 and a fill region 109 at least partially surrounding the knob element 102. The fill region 109 can be a color, pattern, shadow or a combination of these visual properties. A slider element 110 is displayed beneath the knob element 102. In some implementations, the slider element 110 can be displayed along a side of the knob element 102. The slider element 110 can have a first dimension and a second dimension, where the second dimension is longer than the first dimension (e.g., a square rectangle or rounded rectangle). The slider element 110 can provide a visual clue of the interaction model for the knob control 102, which in this example is linear motion in the horizontal or +/−x direction. Because, in this implementation, the slider element 110 is only present when the control object 100 is selected or active, screen space is conserved, which can be advantageous for portable devices with smaller screens or applications that require a dense array of control objects or groups of control objects (e.g., a virtual mixer board).

When the user moves the pointing device (or a finger if the display is touch sensitive) in the direction of the second or longer dimension of the slider element 110 (e.g., the +/−x or horizontal direction in FIG. 1C), the user can change the value of the knob element 102. The fill portion 104 and a fill bar 112 in the slider element 110 can both represent the current value of the knob element 102. As the user moves the pointing device or a finger horizontally (+/−x direction) along the display, the fill bar 112 of the slider element 110 and the fill portion 104 of the knob element 102 change to indicate the current value of the control. The amount of change can be limited by the minimum and maximum range limit values displayed at the ends of the slider element 110. In some implementations, the value of the knob element 102 can also be changed through manual text entry. In some implementations, the mouse cursor image is not displayed (e.g., hidden) while the user moves the pointing device to decouple the visual size of the slider element 110 from the active input region for detecting the movement. The wider active input region provides better resolution for the knob element 102 because the user is provided with more physical screen space for movement of the pointing device than if the mouse cursor image was displayed and used to interact with the slider element 110.

Figure 1D:
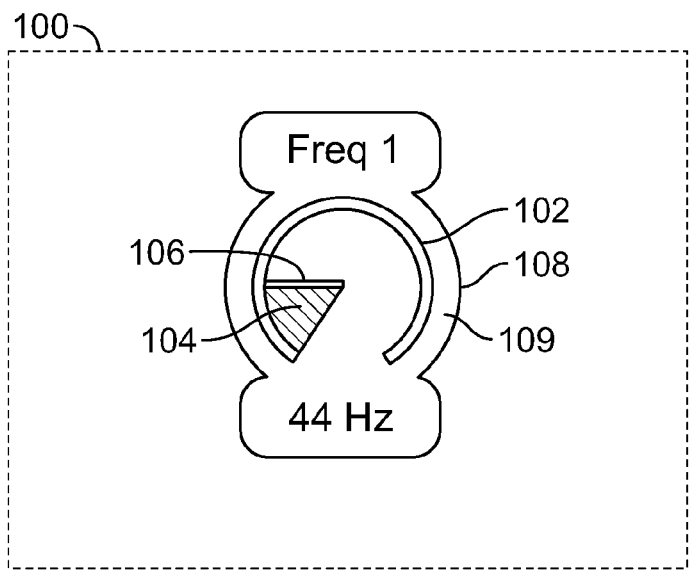
FIG. 1D illustrates the appearance of a knob element of the control object when operated in a remote control state.

FIG. 1D illustrates the appearance of the knob element 102 of the control object 100 when operated in a remote control state. In this example, the knob element 102 controls frequency in an audio application and can be controlled by automation or MIDI. In the remote control state, the outline of the knob element 102 can be made brighter to indicate the selected state and parameter name and value/units labels can be displayed on the top and bottom of the knob element 102. Additionally, an outline 108 and fill region 109 can be displayed at least partially surrounding the knob element 102. In remote control state, the minimum and maximum text labels are not shown but could be if desired. When the value of the knob element 102 is changed remotely, the change can be indicated by a corresponding change in the fill portion 104 of the knob element 102.

Figure 2A:
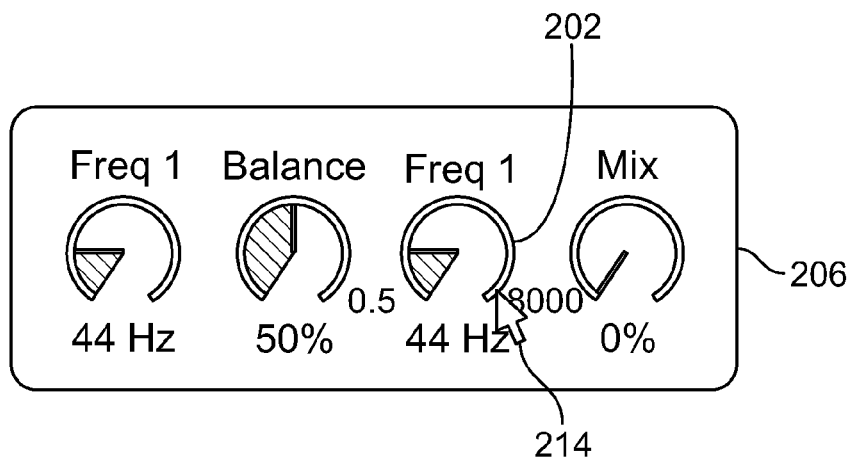
FIG. 2A illustrates a group of knob elements in a first active state.

FIG. 2A illustrates a group of knob elements 206 in a first active state. The group of knob elements 206 includes four knob elements, which could be used in an audio application. In the first active state, the user has moused-over the group of knob elements 206 and the mouse pointer 214 is visible.

Figure 2B:
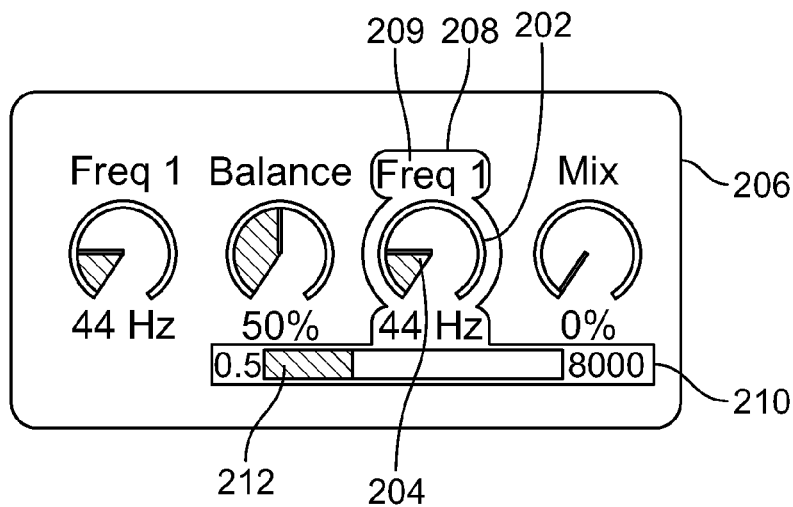
FIG. 2B illustrates the group of knob elements of FIG. 2A with one knob element in a second active state.

FIG. 2B illustrates the group of knob elements 206 with one knob element 202 in a second active state. In the second active state (e.g., a mouse-down control state), the knob element 202 is activated. Upon activation, the knob element 202 can be augmented with an outline 208 and fill region 209, as well as a slider element 210. Minimum and maximum text labels can be displayed on opposite ends of the slider element 210. A fill bar 212 in the slider element 210 and a corresponding fill portion 204 of the knob element 202 can indicate the current value as a percentage of an allowable range of the value of the knob element 202. In this implementation, the mouse cursor image is not displayed to provide increased resolution for the knob element 202 as previously described in reference to FIG. 1C. Horizontal movement of a mouse pointer or finger near (e.g., under) or over the slider element 210 in either direction results in a change in the value of the knob element 202 within the range specified by the minimum and maximum text labels. The direction of the mouse pointer or finger can be visually indicated by the longer dimension of the slider element 210. In some implementations, the fill bar 212 can increase in both directions from the center of the slider element 210 (e.g., bipolar) depending on the function of the knob element 202. For example, the "Balance" parameter knob element is shown with a current value of 50%. If this knob element were active and manipulated by the user, then a bipolar fill bar 212 can be used to indicate the current value of the knob element for the "Balance" parameter.

Figure 3A:
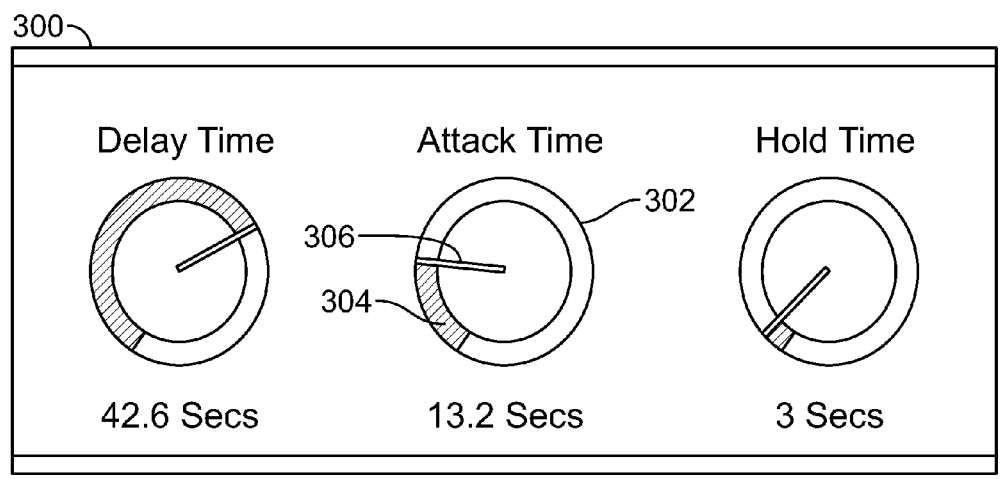
FIG. 3A illustrates a group of knob elements in a default state.

FIG. 3A illustrates a group of knob elements 300 in a default state. The group 300 includes a three knob elements, which are typical for a virtual audio compressor. In this example, a knob element 302 can include text labels indicating a parameter name and current value/units of the knob element 302. In addition to the text labels, a fill portion 304 shows the current value as a percentage of the allowable range of the knob element 302 and line 306 provides the current value.

Figure 3B:
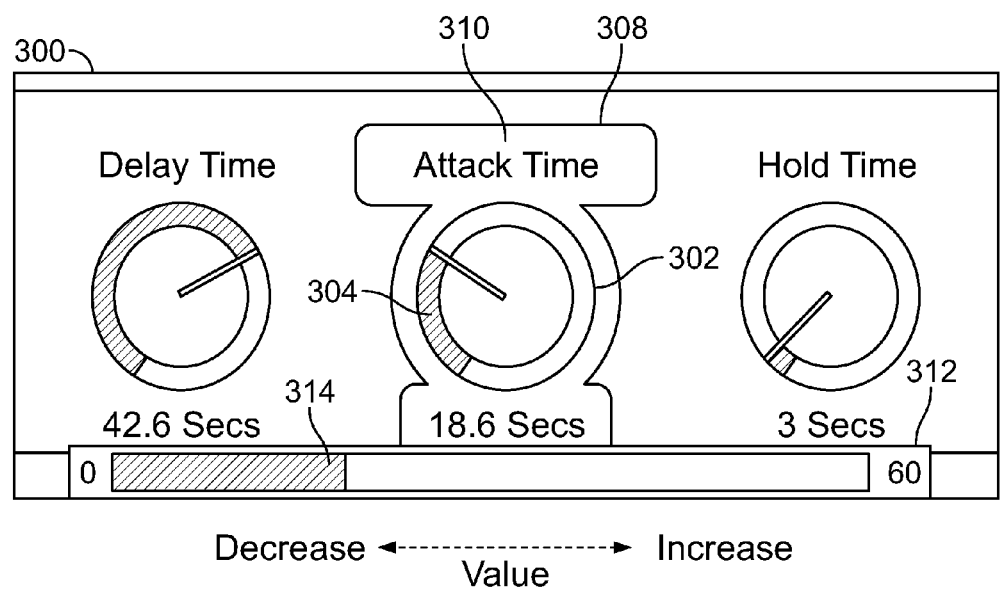
FIG. 3B illustrates the group of knob elements with a knob element in an active state.

FIG. 3B illustrates the group of knob elements 300 with the middle knob element 302 in an active state. The knob element 302 can be augmented with an outline 308 and fill region 310 at least partially surrounding the knob element 302. A slider element 312 is displayed at the bottom of the knob element 302. The slider element 312 includes a fill bar 314 corresponding to the fill portion 304 of the knob element 302. Text labels for minimum and maximum range limits can also be displayed at either end of the slider element 312.

A user can change the current value of the knob element 302 by moving a mouse pointer (or stylus or finger) horizontally beneath or along the slider element 302. In the hybrid state, the mouse cursor image is not displayed to provide increased resolution for the knob element 302 as previously described in reference to FIG. 1C.

In some implementations, the slider element 302 can be displayed vertically along the left or right side of the knob element 302. In such an implementation, a user's vertical movement of a mouse pointer, stylus or finger along or proximate to the slider element 302 changes the value of the knob element 302.

Exemplary Process

Figure 4:
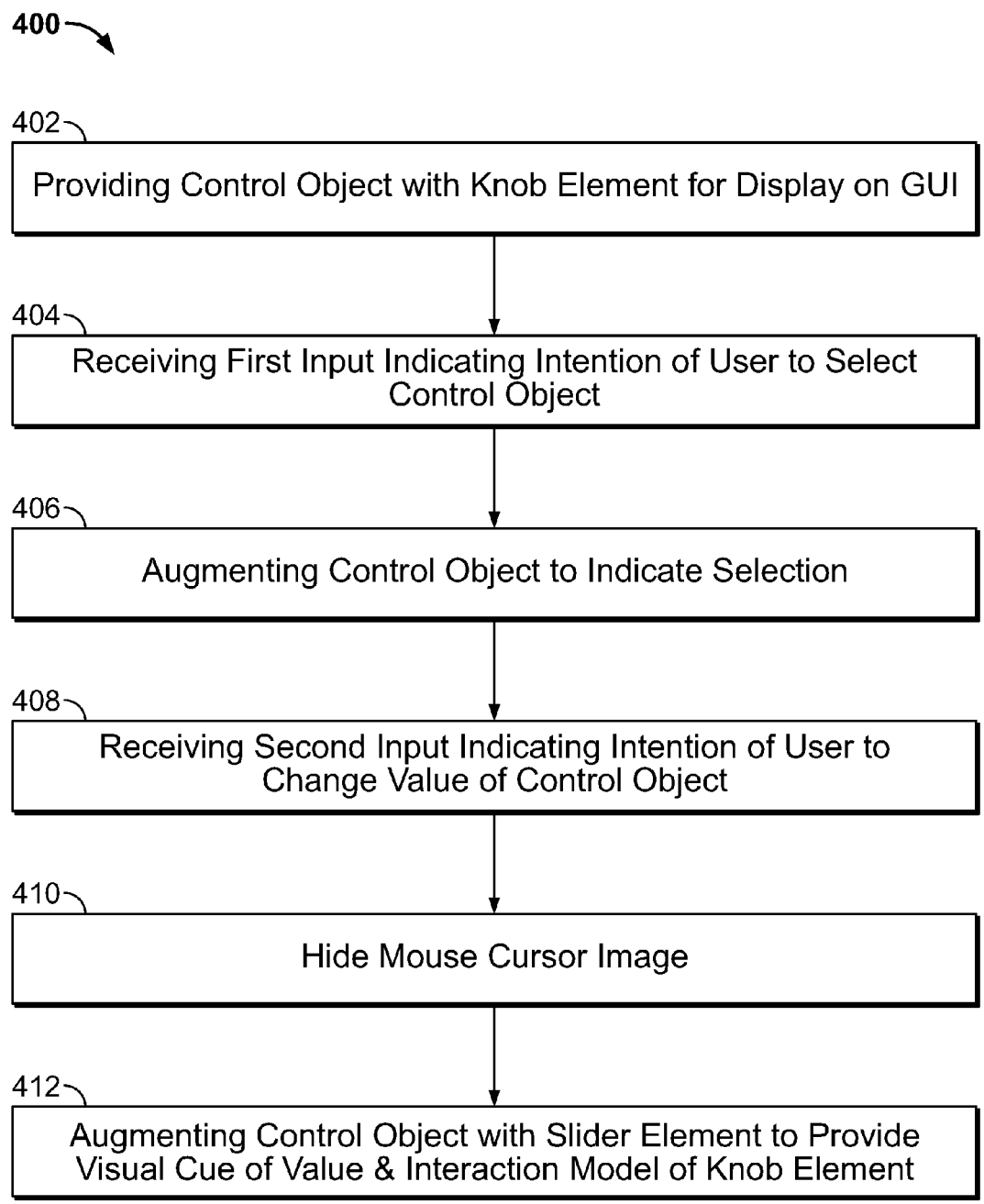
FIG. 4 is an exemplary process flow for a hybrid knob/slider control.

FIG. 4 is an exemplary process flow 400 for a hybrid knob/slider control. Process 400 can be used to implement the control object 100 on a system architecture, as described in reference to FIG. 5.

In some implementations, process 400 can begin by providing a control object with a knob element for display on a graphical user interface (402). The control object can be any control object that can control one or more parameters of a system, device or application. In some implementations, the control object can include a group of knob elements. An example application is an audio application, where the knobs elements can be manipulated by a user to adjust volume, frequency, balance, pan, trim, delay, attack time, hold time, or any other audio parameter. The control object can be inserted in an audio or virtual instrument channel of a virtual mixing board of an audio application. For example, the control object can be part of an audio effect (e.g., virtual compressor) or software instrument, which can be made available to the audio application as a "plug-in."

A first input is received indicating an intention of a user to select the control object (404). For example, the first input can be a mouse-over the control object. In response to the mouse-over, the appearance of the control object can be visually augmented to indicate its selection (406). For example, an outline of the knob element can be brightened and text labels can appear, including text labels for minimum and maximum range limits for the value of the control object. Other visual augmentations are also possible, including changing color, shading, background, text, object size, adding animation, flashing or any other visual augmentation that can indicate selection.

A second input is received indicating an intention of the user to change a value of the control object (408). For example, the second input can be a mouse-down or click. The mouse pointer image is not displayed (e.g., hidden) to provide increased resolution (410), as previously described in reference to FIG. 1C. In response to the mouse-down, the control object is augmented with a slider element to provide a visual cue of the value of the control object and of the interaction model of the knob element (412). For example, a user may not know whether to move a mouse pointer vertically, horizontally or in a circle to adjust the knob element. A horizontal slider element can have a first dimension and a second dimension longer than the first dimension, such as a square rectangle or rounded rectangle. The longer, second dimension can provide the visual cue that linear motion in the horizontal direction will manipulate the knob element. The slider element can be positioned on the bottom or the top of the control object as shown in FIGS. 1C, 2A and 3B. The slider element can have a fill bar to provide the visual cue of the value. The fill bar can be colored, shaded and/or patterned. The fill bar can correspond to a fill portion of the knob element, as shown in FIGS. 1C, 2A and 3B. A user can change the value by moving the mouse pointer or other pointing device (e.g., a finger or stylus) along the second dimension of the slider element. Thus, the slider element provides a visual cue of the direction that a user can move a pointer (or finger) to change a value, such as the +/−x or horizontal direction shown in FIG. 1C.

Exemplary System Architecture

Figure 5:
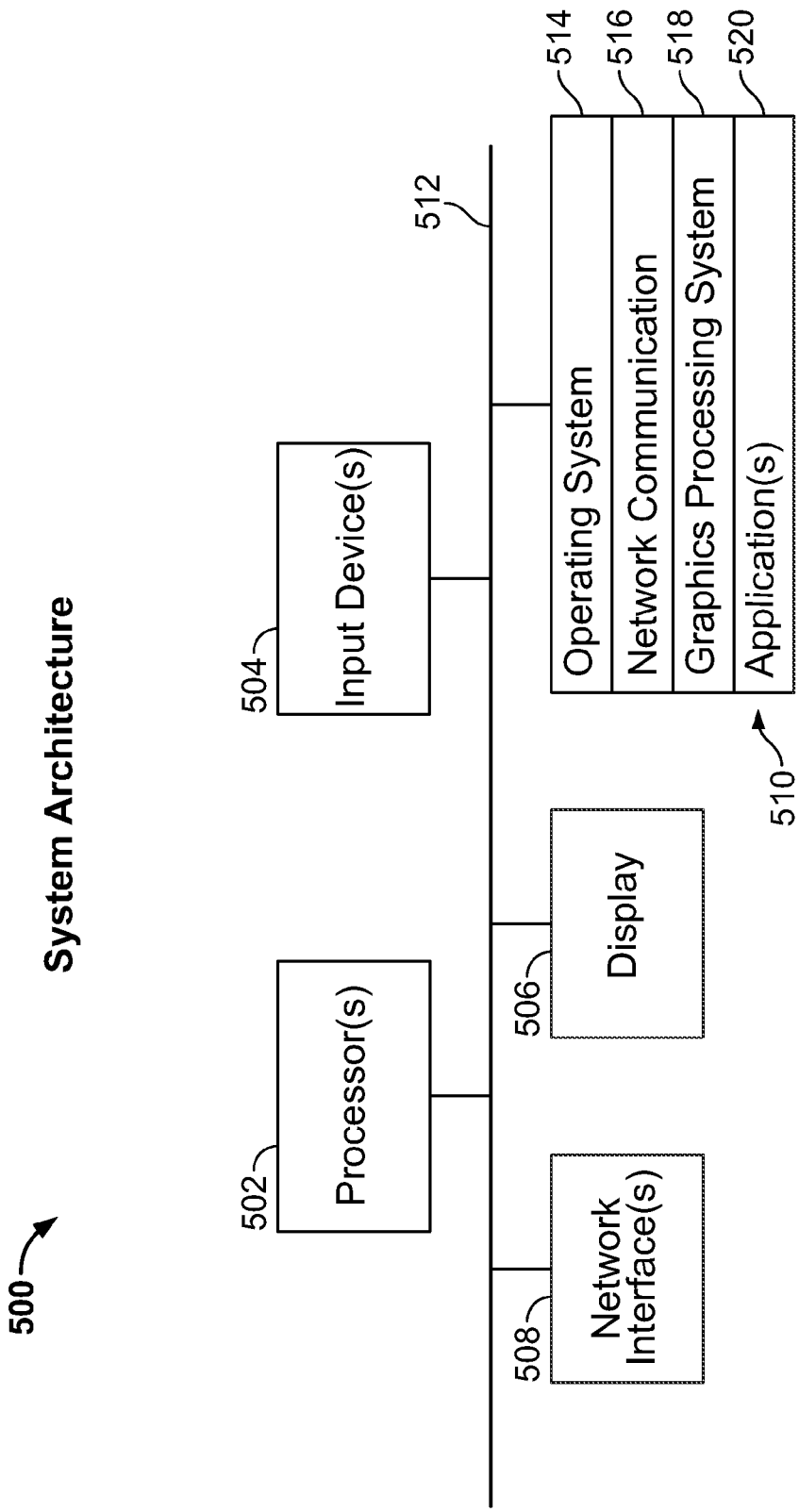
FIG. 5 is a block diagram of an exemplary system architecture implementing a hybrid knob/slider control according to FIGS. 1-4.

FIG. 5 is a block diagram of an exemplary system architecture implementing a hybrid knob/slider control according to FIGS. 1-4. The architecture 500 can be implemented on any electronic device that runs software applications derived from compiled instructions, including without limitation personal computers, servers, smart phones, media players, electronic tablets, game consoles, email devices, etc. In some implementations, the architecture 500 can include one or more processors 502, one or more input devices 504, one or more display devices 506, one or more network interfaces 508 and one or more computer-readable mediums 510. Each of these components can be coupled by bus 512.

Display device 506 can be any known display technology, including but not limited to display devices using Liquid Crystal Display (LCD) or Light Emitting Diode (LED) technology. Processor(s) 502 can use any known processor technology, including but are not limited to graphics processors and multi-core processors. Input device 504 can be any known input device technology, including but not limited to a keyboard (including a virtual keyboard), mouse, track ball, and touch-sensitive pad or display. Bus 512 can be any known internal or external bus technology, including but not limited to ISA, EISA, PCI, PCI Express, NuBus, USB, Serial ATA or FireWire. Computer-readable medium 510 can be any medium that participates in providing instructions to processor(s) 502 for execution, including without limitation, non-volatile storage media (e.g., optical disks, magnetic disks, flash drives, etc.) or volatile media (e.g., SDRAM, ROM, etc.).

Computer-readable medium 510 can include various instructions 514 for implementing an operating system (e.g., Mac OS®, Windows®, Linux). The operating system can be multi-user, multiprocessing, multitasking, multithreading, real-time and the like. The operating system performs basic tasks, including but not limited to: recognizing input from input device 504; sending output to display device 506; keeping track of files and directories on computer-readable medium 510; controlling peripheral devices (e.g., disk drives, printers, etc.) which can be controlled directly or through an I/O controller; and managing traffic on bus 512. Network communications instructions 516 can establish and maintain network connections (e.g., software for implementing communication protocols, such as TCP/IP, HTTP, Ethernet, etc.).

A graphics processing system 518 can include instructions that provide graphics capabilities. For example, the graphics processing system 518 can provide the hybrid knob/slider control object for display on a graphical user interface of display 506, as described with reference to FIGS. 1-4. Application(s) 520 can be any application that uses the control object, such as an audio application. Instructions for generating the control object can be included in the application, the operating system and/or provided as a plug-in to the application (e.g., an Audio Units plug-in).

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method, comprising:
    providing a control object for display on a graphical user interface presented on a display of a device, the control object including at least one knob element;
    receiving a first input indicating a user interaction with the control object;
    adding, in response to the first input, a slider element to the control object, the slider element being added below the knob element, the slider element not being visible prior to receiving the first input and having a first dimension and a second dimension, where the second dimension is longer than the first dimension;
    receiving a second input indicating motion in the graphical user interface, the direction of the motion being along the second dimension of the slider element;
    changing a value of the control object according to the direction of the motion; and
    augmenting the knob element and the slider element to provide visual cues of the value of the control object by at least partially cumulatively filling portions of the knob element and the slider element,
    wherein a contiguous outline surrounds both the knob element and the slider element, the contiguous outline reflecting a perimeter of a combined knob element and slider element.

2. The method of claim 1, further comprising:
    at least partially filling an area between the outline and the knob element with one or more of a shadow, shading, color or pattern.

3. The method of claim 1, where at least partially filling portions further comprises:
    filling the portions with one or more of a shadow, shading, color or pattern to provide the visual cues.

4. The method of claim 1, further comprising:
    displaying text labels with the knob element or the slider element to indicate minimum and maximum range limits for the value.

5. The method of claim 1, where adding the slider element to the control object further comprises:
    detecting when a pointer, stylus or finger is at least partially touching the control object; and
    augmenting the knob element to provide a visual cue that the control object has been selected.

6. The method of claim 1, further comprising:
    receiving manual text entry input setting the value.

7. The method of claim 1, further comprising:
receiving the first input from a pointing device;
displaying a cursor image for the pointing device;
receiving the second input from the pointing device; and
hiding the cursor image for the pointing device at least while receiving the second input.

8. A computer-implemented method, comprising:
providing a control object for display on a graphical user interface presented on a display of a device, the control object including at least one knob element;
receiving a first input from a pointing device indicating an intention of a user to select the control object;
displaying a cursor image for the pointing device on the graphical user interface;
augmenting the control object to indicate its selection using the cursor;
receiving a second input indicating an intention of the user to change a value of the control object;
hiding the cursor image for the pointing device on the graphical user interface at least during the receiving of the second input; and
adding, in response to the second input, a slider element to the control object, the slider element being added below the knob element, the slider element not being visible prior to receiving the second input and being configured to provide a visual cue to the user of the interaction model of the knob element,
wherein the knob element and the slider element are configured to provide visual cues of the value of the control object by at least partially cumulatively filling portions of the knob element and the slider element, and
wherein a contiguous outline surrounds both the knob element and the slider element, the contiguous outline reflecting a perimeter of a combined knob element and slider element.

9. The method of claim 8, where augmenting the control object to indicate its selection, comprises:
augmenting the visual appearance of the knob element.

10. The method of claim 8, where receiving a first input comprises:
detecting a mouse-over event.

11. The method of claim 8, where receiving a second input comprises:
detecting a mouse-down event.

12. A non-transitory computer-readable storage medium having instructions stored thereon, which, when executed by a processor, causes the processor to perform operations, comprising:
providing a control object for display on a graphical user interface presented on a display of a device, the control object including at least one knob element;
receiving a first input indicating a user interaction with the control object;
adding, in response to the first input, a slider element to the control object, the slider element being added below the knob element, the slider element not being visible prior to receiving the first input and having a first dimension and a second dimension, where the second dimension is longer than the first dimension;
receiving a second input indicating motion in the graphical user interface, the direction of the motion being along the second dimension of the slider element;
changing a value of the control object according to the direction of the motion; and
augmenting the knob element and the slider element to provide visual cues of the value of the control object by at least partially cumulatively filling portions of the knob element and the slider element,
wherein a contiguous outline surrounds both the knob element and the slider element, the contiguous outline reflecting a perimeter of a combined knob element and slider element.

13. The non-transitory computer-readable storage medium of claim 12, further comprising:
at least partially filling an area between the outline and the knob element with one or more of a shadow, shading, color or pattern.

14. The non-transitory computer-readable storage medium of claim 12, where at least partially filling portions further comprises:
filling the portions with one or more of a shadow, shading, color or pattern to provide the visual cues.

15. The non-transitory computer-readable storage medium of claim 12, where adding the slider element to the control object further comprises:
detecting when a pointer, stylus or finger are at least partially touching the control object; and
augmenting the knob element to provide a visual cue that the control object has been selected.

16. The non-transitory computer-readable storage medium of claim 12, further comprising:
receiving the first input from a pointing device;
displaying a cursor image for the pointing device;
receiving the second input from the pointing device; and
hiding the cursor image for the pointing device at least while receiving the second input.

17. A non-transitory computer-readable storage medium having instructions stored thereon, which, when executed by a processor, causes the processor to perform operations, comprising:
providing a control object for display on a graphical user interface presented on a display of a device, the control object including at least one knob element;
receiving a first input from a pointing device indicating an intention of a user to select the control object;
displaying a cursor image for the pointing device on the graphical user interface;
augmenting the control object to indicate its selection using the cursor;
receiving a second input indicating an intention of the user to change a value of the control object;
hiding the cursor image for the pointing device on the graphical user interface at least during the receiving of the second input; and
adding, in response to the second input, a slider element to the control object, the slider element being added below the knob element, the slider element not being visible prior to receiving the second input and being configured to provide a visual cue to the user of the interaction model of the knob element,
wherein the knob element and the slider element are configured to provide visual cues of the value of the control object by at least partially cumulatively filling portions of the knob element and the slider element, and
wherein a contiguous outline surrounds both the knob element and the slider element, the contiguous outline reflecting a perimeter of a combined knob element and slider element.

18. The non-transitory computer-readable storage medium of claim 17, where augmenting the control object to indicate its selection, comprises:
augmenting the visual appearance of the knob element.

19. The non-transitory computer-readable storage medium of claim 17, where receiving a first input comprises:
   detecting a mouse-over event.

20. The non-transitory computer-readable storage medium of claim 17, where receiving a second input comprises:
   detecting a mouse-down event.

\* \* \* \* \*